April 8, 1930.  J. F. DAUKUS  1,753,365
FLYWHEEL
Filed April 9, 1928
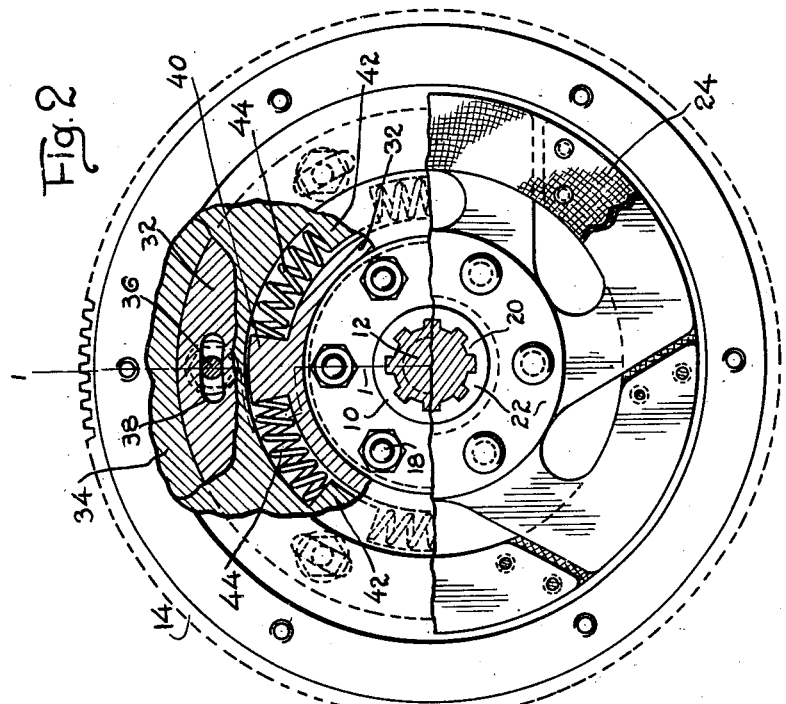
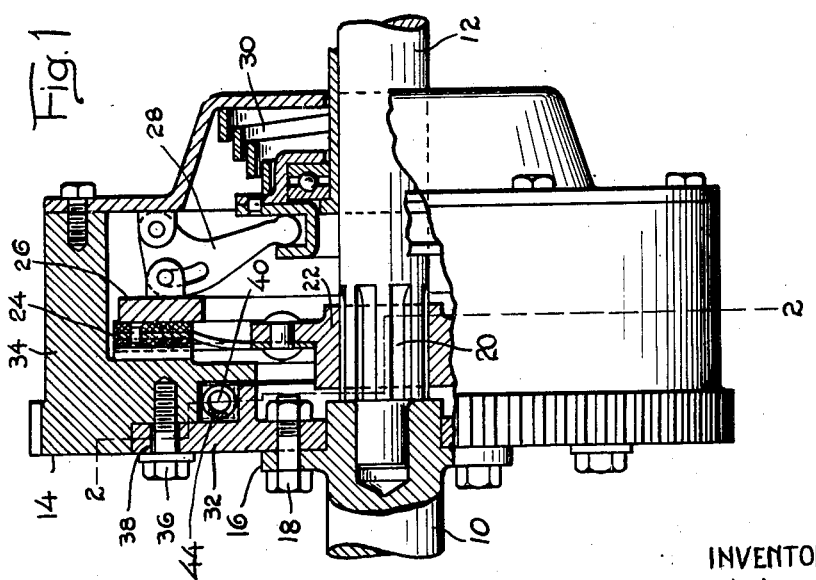
INVENTOR
John F. Daukus
BY
Parker & Burton
ATTORNEYS Patented Apr. 8, 1930

1,753,365

UNITED STATES PATENT OFFICE

JOHN F. DAUKUS, OF DETROIT, MICHIGAN

FLYWHEEL

Application filed April 9, 1928. Serial No. 268,410.

My invention relates to an improved fly wheel and particularly to a fly wheel adapted for employment as part of a clutch structure.

An object is to provide a fly wheel so built that it automatically damps out irregularities of vibration and tends to produce smooth and uniform rotation and particularly during changes in the rate of rotation.

It is peculiarly adapted for internal combustion engine practice wherein the impulses of rotation are successively applied at periodic intervals to a fly wheel. It is likewise peculiarly adapted to be used in combination with clutch mechanism intended for employment in internal combustion engine practice so as to cushion the shock incident to engagement of the clutch members and minimize the character and extent thereof.

An important feature comprises the provision of a fly wheel having a weighted peripheral portion which carries a clutch face and is adapted to cooperate with another clutch face to couple or uncouple the clutch, and which peripheral weighted portion is so connected with the driving shaft portion of the fly wheel as to have a permitted lag with respect thereto.

Other important features and advantages will more fully appear from the following description, appended claims and accompanying drawing, wherein:

Fig. 1 is a side elevation partly in section showing my improvement.

Fig. 2 is a cross-sectional view taken on line 2—2 of Fig. 1.

In the drawing, let 10 and 12 indicate a pair of aligned shafts. Shaft 10 carries a fly wheel hereinafter described and shaft 12 carries clamping mechanism cooperating with clutch means carried by the fly wheel to couple the shafts together. Generally the structure as shown includes a fly wheel indicated in assembly as 14 secured to a flange 16 on the shaft 10 by bolts 18, which fly wheel forms the female part of the clutch mechanism and carries a friction member.

A clutch part 22 is slidably secured upon shaft 12 upon the splines 20 to be moved thereover and carries friction clutch portions 24. A pressure plate 26 is supported to be actuated by operating devices 28 held by a spring 30 to hold the clutch parts together and adapted to be actuated by means not shown to uncouple the clutch.

In so far as the general assembly is concerned, the mechanism employed is old. The particular type of clutch plate used is believed to be novel but it does not form the basis of this application. However, it is not herein disclaimed as applicant intends to file a patent application thereon.

The invention forming the basis of the instant application resides in the fly wheel structure. This fly wheel structure comprises a hub portion 32 which is rigidly secured as hereinabove set forth by bolts 18 to the flange 16 of the shaft 10. There is provided a weighted peripheral female clutch and fly wheel portion 34 which is mounted upon the hub portion 32 forming the fly wheel. This portion 34 is connected with the hub portion through fixed means such as screws 36 threaded into the annular portion 34 and having a limited movement in slots 38 formed in the hub part 32 so as to permit limited rotatable relative displacement of the peripheral portion. The extent of such movement is limited by the extent of the slot.

Such movement is resisted by yielding connections interposed between abutments formed on the two portions. These abutments are here shown as radially projecting lugs 40 upon the hub portion and 42 upon the peripheral portion. Yielding connections here shown in the form of springs 44 are interposed between these lugs to resist the relative rotatable displacement of such portions and to damp out the shock incident to picking up the rotation and to any irregularities thereof. The unyielding connections 36 determine the extent of such rotatable displacement prior to complete compression of the springs 44.

It will be seen that this outer peripheral relatively rotatably displaceable part of the fly wheel is the part that carries the clutch cooperating face as illustrated in Fig. 1.

What I claim is:

1. In combination with a pair of aligned rotatably supported shafts, a fly wheel having a clutch portion secured to one shaft, a cooperating clutch member movably secured to the other shaft, mechanism operable to move such clutch member into or out of engagement with the clutch portion of the fly wheel to couple or uncouple said shafts for rotation, the clutch portion of said fly wheel and the weighted portion thereof consisting of a unitary structure resiliently connected with the shaft portion of the wheel to resistingly permit limited overrunning rotatable movement thereof.

2. In combination with a pair of aligned rotatably supported shafts, a fly wheel secured to one shaft and having a clutch portion, a cooperating clutch member movably secured to the other shaft, mechanism operable to move such clutch member into or out of engagement with the clutch portion of the fly wheel to couple or uncouple said shafts for rotation, the clutch portion of said fly wheel and the weighted portion thereof consisting of a unitary structure separate from the shaft portion of the wheel and connected therewith through spring means adapted to resistingly permit said weighted and clutch portion to lag behind the shaft portion and to assume different angular positions with respect thereto thereby damping out irregularities in the rotation.

3. A fly wheel having a shaft portion and a weighted peripheral female clutch portion secured to the shaft portion to rotate therewith by yielding connections adapted to permit the weighted peripheral clutch portion to lag resistingly a limited distance, and rigid connections determining the extent of such lag.

4. A fly wheel having a shaft portion and a weighted peripheral clutch portion secured to the shaft portion to rotate therewith by yielding connections adapted to permit the weighted peripheral clutch portion to lag resistingly a limited distance, and rigid connections determining the extent of such lag adapted to take the torque off of the yielding connections prior to reaching the limit of their yielding capacity.

In testimony whereof, I, JOHN F. DAUKUS, sign this specification.

JOHN F. DAUKUS.